(12) United States Patent  
Ausserlechner

(10) Patent No.: US 10,502,543 B2
(45) Date of Patent: Dec. 10, 2019

(54) MAGNETIC ANGLE SENSOR DEVICE AND METHOD OF OPERATION

(71) Applicant: Infineon Technologies AG, Neubiberg (DE)

(72) Inventor: Udo Ausserlechner, Villach (AT)

(73) Assignee: Infineon Technologies AG, Neubiberg (DE)

(*) Notice: Subject to any disclaimer, the term of this patent is extended or adjusted under 35 U.S.C. 154(b) by 119 days.

(21) Appl. No.: 15/705,355

(22) Filed: Sep. 15, 2017

(65) Prior Publication Data

US 2018/0087888 A1 Mar. 29, 2018

(30) Foreign Application Priority Data

Sep. 28, 2016 (DE) .................. 10 2016 118 390

(51) Int. Cl.
*G01B 7/14* (2006.01)
*G01B 7/30* (2006.01)
*G01D 5/14* (2006.01)

(52) U.S. Cl.
CPC .............. *G01B 7/30* (2013.01); *G01D 5/145* (2013.01)

(58) Field of Classification Search
CPC . G01B 7/30; G01B 7/003; G01B 7/14; G01D 5/145; G01D 5/147; G01D 5/202;
(Continued)

(56) References Cited

U.S. PATENT DOCUMENTS 7,064,537 B2 * 6/2006 Sudo ...................... G01D 5/145
324/207.21
8,698,490 B2 4/2014 Ausserlechner
(Continued)

FOREIGN PATENT DOCUMENTS

CN 102564471 A 7/2012
CN 104655004 A 5/2015
(Continued)

OTHER PUBLICATIONS

Popovic Radivoje S., "Hall Effect Devices", CRC Press, 2003, e.g., chapters 5.3 and 5.4, pp. 250-273.
(Continued)

*Primary Examiner* — Thang X Le
(74) *Attorney, Agent, or Firm* — Harrity & Harrity, LLP

(57) ABSTRACT

An embodiment relates to a magnetic angle sensor device comprising a first group of magnetic angle sensors and a second group of magnetic angle sensors, wherein the first group of magnetic angle sensors and the second group of magnetic angle sensors are located on different positions along a straight line, wherein the first group of magnetic angle sensors comprises at least one first type of angle sensor and at least one second type of angle sensor, wherein the second group of magnetic angle sensors comprises the at least one first type of angle sensor and the at least one second type of angle sensor, wherein the at least one first type of angle sensor is sensitive to detect a first magnetic field component in a first direction and the at least one second type of angle sensor is sensitive to detect a second magnetic field component in a second direction, and wherein a combined rotation angle is determined based on the detected first magnetic field components and the detected second magnetic field components.

31 Claims, 3 Drawing Sheets

(58) Field of Classification Search
CPC ...... G01D 5/206; G01D 5/225; G01D 5/2208;
G01D 5/12; G01D 5/14; G01D 5/16;
G01D 5/2457; G01D 5/2013; G01D
5/2046; G01D 7/04; G01R 33/0206;
G01R 33/06; G01R 33/063; G01R 33/09;
G01R 33/093; G01R 33/0052; G01R
33/18; G01P 1/026; G01P 3/66; G01P
3/68; G01P 3/665; G01P 3/443; G01P
3/488; G01P 3/487; G01P 3/481; G01P
3/685; G01N 27/9033; G01N 27/902;
G01N 27/9013; G01N 27/904; G01N
27/223; G01N 27/82; G01N 27/9093
See application file for complete search history.

(56) References Cited

U.S. PATENT DOCUMENTS

| | | |
|---|---|---|
| 9,267,781 B2 | 2/2016 | Ausserlechner |
| 9,400,194 B2 * | 7/2016 | Shimauchi ............... G01D 5/16 |
| 2011/0187351 A1 * | 8/2011 | Hunger .................. G01D 5/145 |
| | | 324/207.2 |
| 2012/0194175 A1 * | 8/2012 | Ausserlechner ..... G01D 5/2451 |
| | | 324/207.14 |
| 2015/0008907 A1 * | 1/2015 | Janisch .................. G01D 5/145 |
| | | 324/207.25 |
| 2015/0219472 A1 | 8/2015 | Ausserlechner |
| 2015/0276893 A1 | 10/2015 | Kaufmann et al. |

FOREIGN PATENT DOCUMENTS

| | | |
|---|---|---|
| DE | 102015101635 | 8/2015 |
| DE | 102014004625 | 10/2015 |
| EP | 2354769 | 8/2011 |

OTHER PUBLICATIONS

Metz et al., "Contactless Angle Measurement Using Four Hall Devices on Single Chip", IEEE International Conference on Solid-State Sensors and Actuators, Chicago, Jun. 16-19, 1997, 4 pages.
Wikipedia, "CORDIC," Aug. 28, 2017, 13 pages.

* cited by examiner

MAGNETIC ANGLE SENSOR DEVICE AND METHOD OF OPERATION

RELATED APPLICATION

This application claims priority under 35 U.S.C. § 119 to German Patent Application No. 102016118390.3, filed on Sep. 28, 2016, the content of which is incorporated by reference herein in its entirety.

TECHNICAL FIELD

Embodiments of the present disclosure relate to a magnetic angle sensor arrangement that allows determining a rotational position or movement of a shaft.

SUMMARY

A first embodiment relates to a magnetic angle sensor device comprising:
  a first group of magnetic angle sensors and a second group of magnetic angle sensors,
  wherein the first group of magnetic angle sensors and the second group of magnetic angle sensors are located on different positions along a straight line,
  wherein the first group of magnetic angle sensors comprises at least one first type of angle sensor and at least one second type of angle sensor,
  wherein the second group of magnetic angle sensors comprises at least one first type of angle sensor and at least one second type of angle sensor,
  wherein the first type of angle sensor is sensitive to detect a first magnetic field component in a first direction and the second type of angle sensor is sensitive to detect a second magnetic field component in a second direction,
  wherein a combined rotation angle is determined based on the detected first magnetic field components and the detected second magnetic field components.

A second embodiment relates to a magnetic sensor device comprising:
  a first group of magnetic angle sensors and a second group of magnetic angle sensors,
  wherein the first group of magnetic angle sensors and the second group of magnetic angle sensors are arranged separated from each other,
  wherein the first group of magnetic angle sensors comprises at least one first type of angle sensor and at least one second type of angle sensor,
  wherein the second group of magnetic angle sensors comprises at least one first type of angle sensor and at least one second type of angle sensor,
  wherein the at least one first type of angle sensor of the first group of magnetic angle sensors determines a first signal based on a magnetic field $B_x$ at a first location,
  wherein the at least one first type of angle sensor of the second group of magnetic angle sensors determines a second signal based on the magnetic field $B_x$ at a second location,
  wherein the at least one second type of angle sensor of the first group of magnetic angle sensors determines a third signal based on a magnetic field $B_y$ at a third location,
  wherein the at least one second type of angle sensor of the second group of magnetic angle sensors determines a fourth signal based on the magnetic field $B_y$ at a fourth location.

A third embodiment relates to a method for determining a combined rotation angle by a magnetic angle sensor device,
  wherein the magnetic angle sensor device comprises:
  a first group of magnetic angle sensors and a second group of magnetic angle sensors,
  wherein the first group of magnetic angle sensors and the second group of magnetic angle sensors are located on different positions along a straight line,
  wherein the first group of magnetic angle sensors comprises at least one first type of angle sensor and at least one second type of angle sensor,
  wherein the second group of magnetic angle sensors comprises at least one first type of angle sensor and at least one second type of angle sensor,
  wherein the method comprises:
  detecting by the first type of angle sensor a first magnetic field component in a first direction,
  detecting by the second type of angle sensor a second magnetic field component in a second direction,
  determining the combined rotation angle based on the detected first magnetic field components and the detected second magnetic field components.

A fourth embodiment is directed to a method for determining a combined rotation angle by a magnetic angle sensor device,
  wherein the magnetic angle sensor device comprises:
  a first group of magnetic angle sensors and a second group of magnetic angle sensors,
  wherein the first group of magnetic angle sensors and the second group of magnetic angle sensors are arranged separated from each other,
  wherein the first group of magnetic angle sensors comprises at least one first type of angle sensor and at least one second type of angle sensor,
  wherein the second group of magnetic angle sensors comprises at least one first type of angle sensor and at least one second type of angle sensor,
  wherein the method comprises:
  determining by the at least one first type of angle sensor of the first group of magnetic angle sensors a first signal based on a magnetic field $B_x$ at a first location, determining by the at least one first type of angle sensor of the second group of magnetic angle sensors a second signal based on the magnetic field $B_x$ at a second location,
  determining by the at least one second type of angle sensor of the first group of magnetic angle sensors a third signal based on a magnetic field $B_y$ at a third location,
  determining by the at least one second type of angle sensor of the second group of magnetic angle sensors a fourth signal based on the magnetic field $B_y$ at a fourth location,
  determining a first difference between the first signal and the second signal,
  determining a second difference between the third signal and the fourth signal,
  determining the combined rotation angle of a shaft based on the first difference and the second difference.

A fifth embodiment relates to a computer program product directly loadable into a memory of a digital processing device, comprising software code portions for performing the steps of the method as described herein.

A sixth embodiment is directed to a computer-readable medium having computer-executable instructions adapted to cause a computer system to perform the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
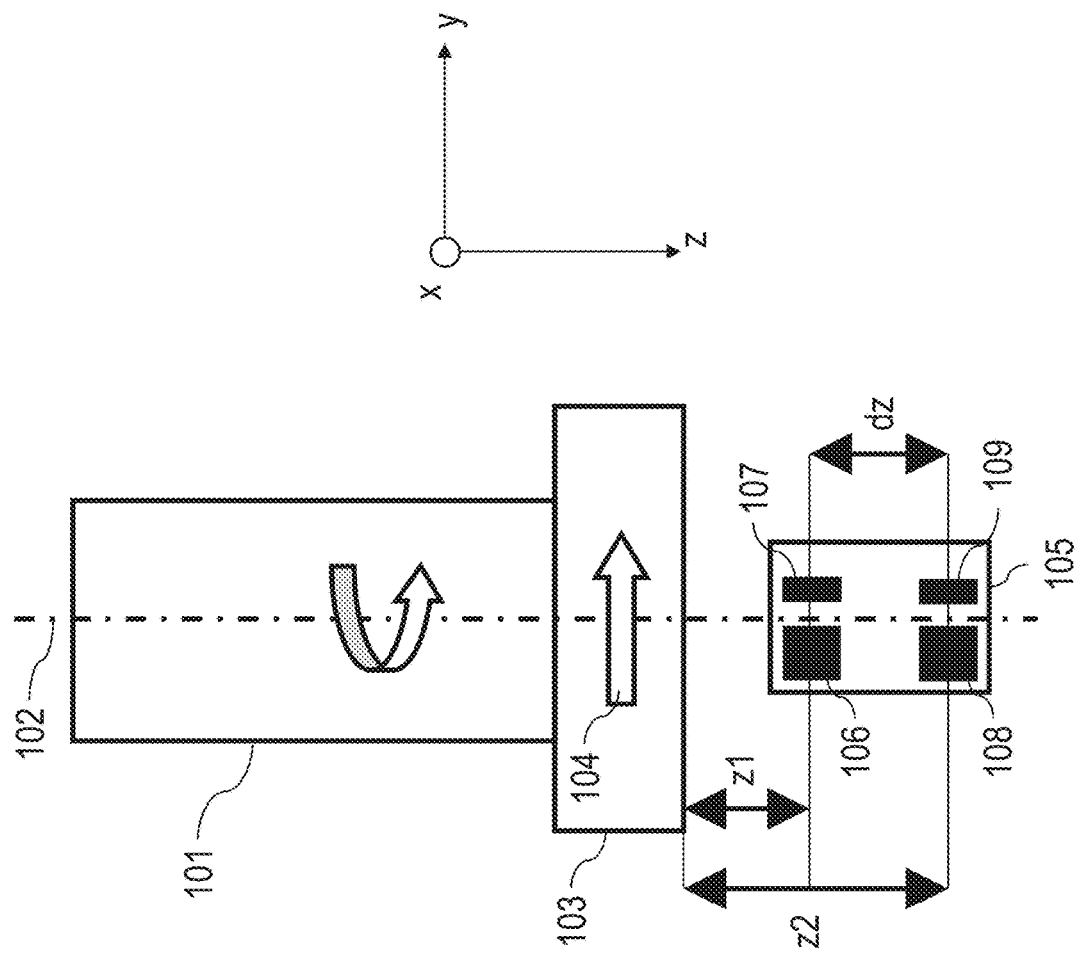
FIG. 1 shows an exemplary solution comprising a shaft that is arranged to rotate around a rotation axis, wherein a permanent magnet is arranged on (fixed to) the shaft and rotates above a magnetic angle sensor device.

Examples described herein in particular refer to magnetic angle sensors, where a permanent magnet is attached to a rotatable shaft and a magnetic field sensor is placed on the rotation axis and adjacent to the magnet. The magnetic angle sensor detects the rotatable magnetic field, which points in diametric direction, and therefrom it infers the rotational position of the shaft.

Various sensors can be used, e.g., an anisotropic magneto-resistor (AMR), a giant magneto-resistor (GMR), a tunneling magneto-resistor (TMR), Hall-effect devices (e.g., Hall plates, vertical Hall-effect devices) or MAG-FETs (e.g., split-drain MAG-FETs).

An exemplary contactless angle measurement device using four Hall devices on a single chip is described in [M. Metz, et al.: Contactless Angle Measurement Using Four Hall Devices on Single Chip, 1997 International Conference on Solid-State Sensors and Actuators, Chicago, Jun. 16-19, 1997, IEEE].

A z-component is referred to as a component parallel to the rotation axis of the shaft (or along the shaft itself), an x-y-plane is perpendicular to the rotation axis of the shaft. The x-y-z-components span a Cartesian coordinate system.

Examples referred to herein in particular reference magnetic field sensors that detect the x component of the magnetic field. Hence, the magnetic field sensor may comprise a Hall plate (also referred to as HHall) and/or a MAG-FET with a y-z-plane sensitive to the magnetic field to be determined.

The z-component of a magnetic field of a (substantially) homogeneously magnetized permanent magnet in a diametric direction (i.e., in y-direction), which is then determined on a main surface of a die of the magnetic field sensor (which corresponds to the x-y-plane) and resembles substantially an oblique plane. However, its surface is not an exact plane; it is only a plane within a small distance to the rotation axis. At a larger distance, e.g., from 1 mm to 3 mm off the rotation axis, it slightly deviates from a plane and the surface exhibits some curvature, which leads to angle errors in practical angle sensing systems.

In case the magnetic field Bz along the z-component is an approximate plane, the following applies:

$B_z(x,y) = C \cdot y + O(x^3, y^3)$ with $O(x^3, y^3)$ referring to small curvature portions with dominant terms of 3rd order in x-y-distances. C indicates a proportional constant that indicates the strength of the magnet material and also contains geometric details of the magnet.

The permanent magnet rotates on the shaft with an angle $\varphi$. This results in $y \to x \cdot \sin \varphi + y \cdot \cos \varphi$ and with $x = R \cdot \cos \psi, y = R \cdot \sin \psi$ the following applies:

$B_z = C \cdot R \cdot \sin(\varphi + \psi) + O(R^3)$.

This corresponds to a pure sine-wave and if the magnetic field Bz deviates from the plane this results to higher harmonics that lead to angle errors.

Known solutions cope with these higher harmonics by introducing a larger number of angle sensors, i.e., at least eight sensing elements, wherein all sensing elements need to be supplied and tapped with signal lines, which are periodically exchanged according to a spinning current scheme in order to cancel out offset errors which further requires a significant amount of MOS-switches. This leads to a circuitry that uses a large space on the chip which further results in parasitic-like capacitances, inductances and resistances, and requires a significant amount of electric power.

Examples presented herein, however, provide a more efficient solution using a smaller number of angle sensors and it allows reducing or cancelling magnetic disturbance fields.

An orientation of a Bz-plane is given by gradients dBz/dx and dBz/dy, i.e., the arctan between these gradients provides the angle of the Bz-plane, e.g., $$\varphi = \arctan_2\left(\frac{dB_z}{dy}, \frac{dB_z}{dx}\right).$$

These gradients would be beneficially known at the location on the rotation axis. However, due to the placement of the angle sensors, there is a finite distance (deviation in x- and y-direction, indicated by $\partial_x$ and $\partial_y$) between the sensor and the rotation axis, which leads to:

$$\frac{B_z\left(x + \frac{\partial_x}{2}; y\right) - B_z\left(x - \frac{\partial_x}{2}; y\right)}{\partial_x} \text{ and } \frac{B_z\left(x; y + \frac{\partial_y}{2}\right) - B_z\left(x; y - \frac{\partial_y}{2}\right)}{\partial_y}.$$

Hence, Hall plates may be placed on a small reading radius R amounting to a range of, e.g., 0.5 mm to 2.5 mm around the rotation axis. This allows approximating the gradients dBz/dx and dBz/dy by finite differences.

As an alternative, Maxwell's law $\nabla \cdot B = 0$ which means that there are no magnetic monopoles and that the total magnetic flux through a closed surface is zero. Hence, $$\frac{dB_z}{dx} = \frac{dB_x}{dz} \text{ and } \frac{dB_z}{dy} = \frac{dB_y}{dz}.$$

Therefore, two gradients on the rotation axis can be used. This is more convenient for the layout, because less sensor elements are required populating the reading circle, i.e., around the rotation axis. Only two Bx-angle sensors and two By-angle sensors suffice, both spaced apart on the rotation axis. The rotation angle φ of the magnet may then be determined according to $$\varphi = \arctan_2\left(\frac{dB_y}{dz}, \frac{dB_x}{dz}\right).$$

FIG. 1 shows an exemplary solution comprising a shaft 101 that is arranged to rotate around a rotation axis 102, wherein a permanent magnet 103 is arranged on (fixed to) the shaft 101. An arrow 104 indicates a diametric magnetization in y-direction of the permanent magnet 103.

An angle sensor device 105 is placed below the permanent magnet 103 (e.g., at a distance ranging from 1 mm to 2 mm), but in the vicinity to the permanent magnet 103. The angle sensor device 105 is at least partially located on the rotation axis 102. According to an exemplary embodiment, the rotation axis 102 lies in a surface of a chip, which comprises the sensor elements.

The rotation axis 102 corresponds to a z-axis, a y-axis is a horizontal axis and an x-axis emerges into the plane of projection. The x-, y- and z-axes define a Cartesian coordinate system. In this example, the x-direction points into the drawing plane.

The angle sensor device 105 comprises a Hall plate 106, a vertical Hall device 107, a Hall plate 108 and a vertical Hall device 109. The center of the Hall plate 106 and the center of the vertical Hall device 107 are located at a distance z1 from the permanent magnet 103 and the center of the Hall plate 108 and the center of the vertical Hall device 109 are located at a distance z2 from the permanent magnet 103. A difference between the distances z1 and z2 is denoted as dz.

It is noted that different magnets than the permanent magnet may be used: the magnet 103 attached to the shaft 101 may be a ring-shaped magnet, a block-shaped magnet, a conical magnet, a tapered magnet, a spherical magnet, an elliptical magnet or the like. Also, combinations of the above could apply. The magnetization of the magnet may be homogeneous or inhomogeneous. For example, half of the magnet may be magnetized in positive z-direction, the other half of the magnet may be magnetized in negative z-direction. It is also an option that additionally a homogeneous diametric magnetization is superimposed.

Instead of the permanent magnet, a more complex arrangement comprising conductors and/or coils with current flowing through them and/or ferrous parts which may act as magnetic flux guides may be used.

A Hall plate provides a signal that is proportional to a magnetic field component that orthogonally impacts the Hall plate or the chip comprising the Hall plate. A vertical Hall device provides a signal that is proportional to a magnetic field component that is parallel to this chip. The Hall plate and the vertical Hall device are described, e.g., in [Popovic, Radivoje S.: Hall Effect Devices, CRC Press, 2003, e.g., chapters 5.3 and 5.4].

The Hall plate 106, the vertical Hall device 107, the Hall plate 108 and the vertical Hall device 109 may each be referred to as angle sensor with at least one sensor die. In particular, a group of at least one Hall plate and at least one vertical Hall device may be used for determining an angle of the magnet 103. In the example of FIG. 1, a first group of magnetic angle sensors comprises the Hall plate 106 and the vertical Hall device 107 and a second group of magnetic angle sensors comprises the Hall plate 108 and the vertical Hall device 109.

The Hall plate 106 and the Hall plate 108 each detects a magnetic field Bx in x-direction, wherein its respective sensor die is arranged in the y-z-plane.

The vertical Hall device 107 and the vertical Hall device 109 each detects a magnetic field By in y-direction.

It is noted that the sensor die that is arranged in the y-z-plane is used to detect the magnetic field Bx in x-direction (via the Hall plate) and the magnetic field By in y-direction (via the vertical Hall device).

Hence, each of the Hall plates 106, 108 is referred to as Bx-sensor and each of the Hall devices 107, 109 is referred to as By-sensor.

It is noted that each Bx-sensor and/or each By-sensor may comprise at least one sensor element.

It is noted that the Bx-sensor may comprise a Hall plate or a MAG-FETs and that the By-sensor may comprise a magneto-resistor, e.g., an AMR, a GMR, a TMR or a vertical Hall device (also referred to as VHall or vertical Hall effect device).

The Bx-sensor and the By-sensor may preferably be placed directly on the rotation axis 102.

In the example shown in FIG. 1, the Hall plate 106 (Bx-sensor) is placed slightly off the rotation axis 102 at the distance z1 and the Hall plate 108 (Bx-sensor) is also placed slightly off the rotation axis 102 at the distance z2 from the permanent magnet 103, wherein z2=z1+dz.

It is noted that in FIG. 1 the Hall plates 106, 108 and the vertical Hall devices 107, 109 are illustrated as being rather large in size comparing to the size of the angle sensor device 105; in a real use-case, the angle sensors may be significantly smaller. The angle sensor device 105 may be a chip. It is in particular an option to place the Hall plates 106, 108 and the vertical Hall devices 107, 109 as close to the rotation axis 102 as possible.

A circuitry (e.g., processing unit), not shown in FIG. 1, receives the signals from the Hall plates 106 and 108 and computes a difference of the Bx-fields on both Bx-sensor locations, which corresponds to a gradiometer.

Accordingly, the vertical Hall device 107 (By-sensor) is placed slightly off the rotation axis 102 at the distance z1 and the vertical Hall device 109 (By-sensor) is placed slightly off the rotation axis 102 at a distance z2 from the permanent magnet 103.

The circuitry receives the signals from the vertical Hall devices 107 and 109 and computes a difference of the By-fields on both By-sensor locations.

In the example shown in FIG. 1, the Hall plate 106 and the vertical Hall device 107 are placed at identical z-positions. The same applies for the Hall plate 108 and the vertical Hall device 109. As an option, the Hall plate 106 and the vertical Hall device 107 may be located at (slightly) different z-positions and/or the Hall plate 108 and the vertical Hall device 109 may be located at (slightly) different z-positions. Also, the distance between the Hall plates 106, 108 and the distance between the vertical Hall devices 107, 109 may differ from each other (which would result in two distances dzx and dzy). With this arrangement it is possible to place all Hall plates (H) and all vertical Hall devices (V) right on the rotation axis in a sequence H-V-H-V, H-V-V-H, V-H-H-V or V-H-V-H.

In case the Bx-sensor and the By-sensor cannot be located at the same location, it may be an option that they are arranged such that they have common centroids, i.e., they may be arranged at locations on a chip such that the gravity center of all Bx-sensors that are closer to the magnet (i.e., at the z-position z1) coincides with the gravity center of all By-sensors at the z-position z1. Moreover, it is possible to arrange the sensors so that their gravity centers lie onto the rotation axis.

It is noted that the gravity center may reflect that the mass density of all portions of the sensor elements is homogeneous and constant so that the gravity center is identical to the geometrical gravity center.

Figure 2:
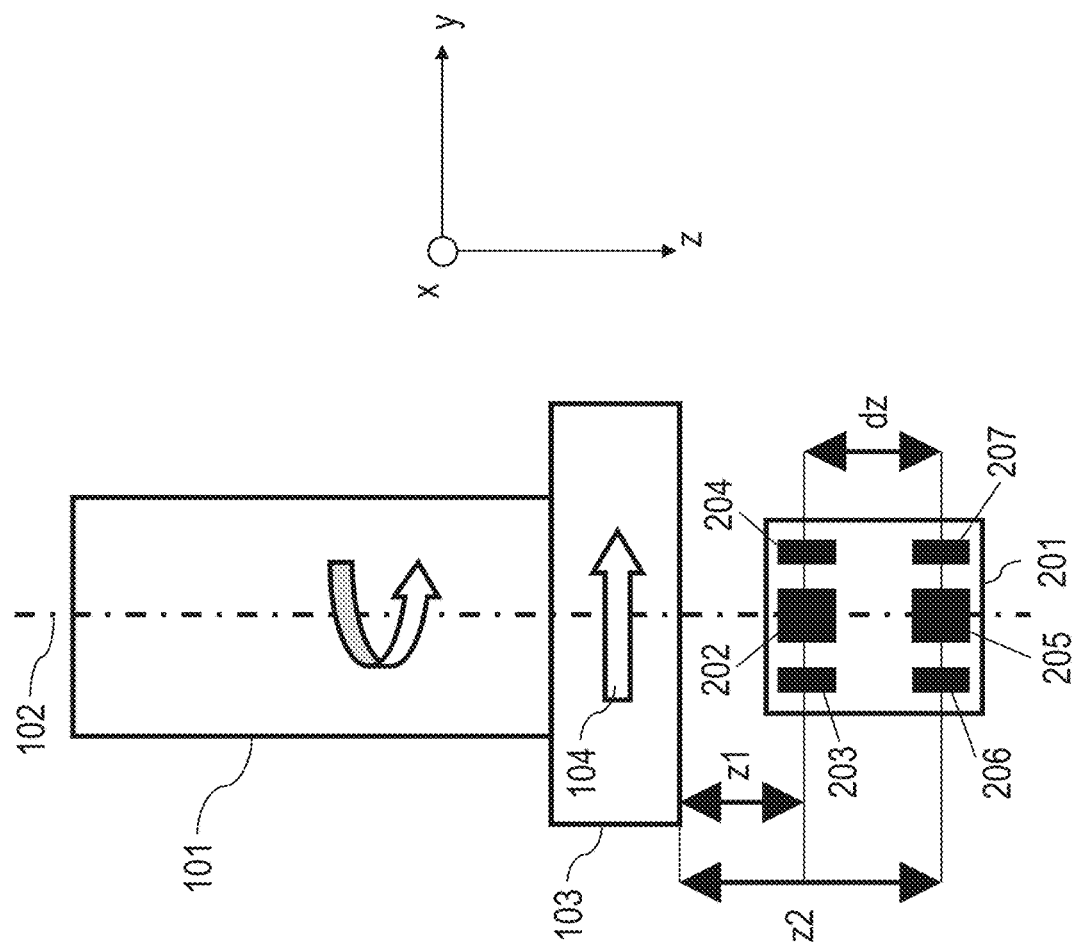
FIG. 2 shows an alternative embodiment based on FIG. 1 with a different angle sensor device.

FIG. 2 shows an alternative embodiment based on FIG. 1, wherein the angle sensor device 105 is replaced by an angle sensor device 201.

A Bx-sensor 202 is placed on the rotation axis 102 and a By-sensor 203 is placed on the left hand side of the Bx-sensor 202 and a By-sensor 204 is placed on the right hand side of the Bx-sensor 202. A circuitry (not shown in FIG. 2) obtains the signals from the sensors 202 to 204 and determines a weighted average By-field for both By-sensors 203, 204.

Accordingly, a Bx-sensor 205 is placed on the rotation axis 102 and a By-sensor 206 is placed on the left hand side of the Bx-sensor 205 and a By-sensor 207 is placed on the right hand side of the Bx-sensor 205. The circuitry obtains the signals from the sensors 205 to 207 and determines an average By-field for both By-sensors 206, 207. Finally, the system computes a first difference between the average of the By-sensors 203, 204 and the average of the By-sensors 206, 207 and it computes a second difference of the Bx-sensors 202 and 205 and it may use the first difference and the second difference as inputs to a CORDIC algorithm to compute the combined rotation angle of the magnet 103. Details of the CORDIC algorithm can be found, e.g., at https://en.wikipedia.org/wiki/CORDIC.

The sensors 202 to 205 are located at a distance z1 from the permanent magnet 103 and the sensors 205 to 207 are located at a distance z2 from the permanent magnet 103, wherein z2=z1+dz.

Beneficially, the rotation axis lies in a plane which contains the chip surface with the sensors 202 to 204 or the sensors 205 to 207, respectively. The rotation axis does not have to be in the middle of the respective sensors.

Figure 3:
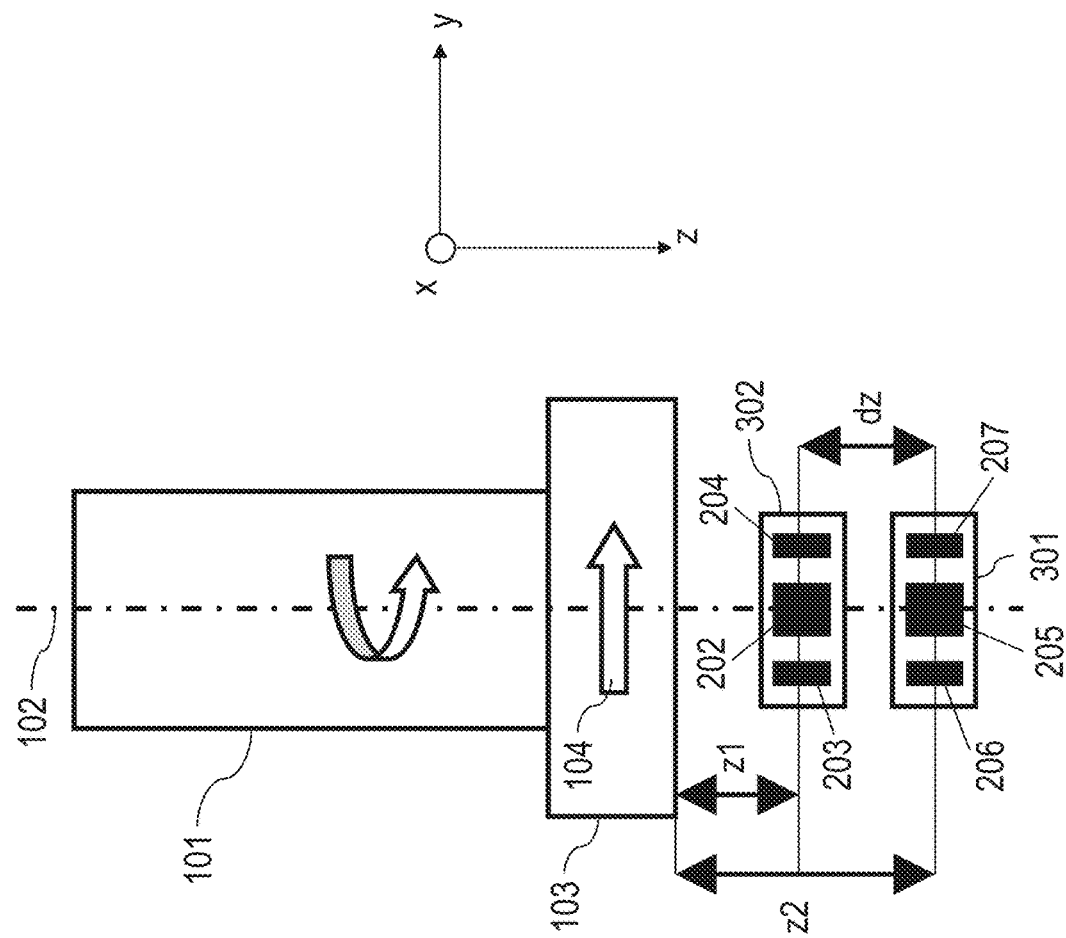
FIG. 3 shows yet another embodiment based on FIG. 2, which now comprises two separate angle sensor devices.

FIG. 3 shows yet another embodiment based on FIG. 2, which now comprises two separate angle sensor devices 301 and 302. The angle sensor device 301 comprises the sensors 202 to 204 and the angle sensor device 302 comprises the sensors 205 to 207. The sensors 202 to 207 are described with regard to FIG. 2.

It is noted that each angle sensor device may comprise at least one chip (die), wherein this at least one chip may be embedded in a housing, which provides electrical contacts to be connected to the circuitry for processing the signals of the angle sensor device. In this regard, each angle sensor device may comprise several angle sensors, which may comprise at least one angle sensor element.

The sensors shown in FIGS. 1-3 have a die that is arranged in parallel to the z-axis. The Bx-sensors and the By-sensors are arranged in the y-z-plane. Hence, the sensor die may be mounted and/or assembled in a leaded package like the PG-SSO-3 or PG-SSO-4 packages of Infineon Technologies AG.

It is also an advantage of the angle sensor device provided herein that it is more robust against disturbances, because it can be placed such that it does not respond to stray fields, in particular to axial field components.

The examples suggested herein may in particular be based on at least one of the following solutions. In particular combinations of the following features could be utilized in order to reach a desired result. The features of the method could be combined with any feature(s) of the device, apparatus or system or vice versa.

A magnetic angle sensor device is provided comprising:
  a first group of magnetic angle sensors and a second group of magnetic angle sensors,
  wherein the first group of magnetic angle sensors and the second group of magnetic angle sensors are located on different positions along a straight line,
  wherein the first group of magnetic angle sensors comprises at least one first type of angle sensor and at least one second type of angle sensor,
  wherein the second group of magnetic angle sensors comprises at least one first type of angle sensor and at least one second type of angle sensor,
  wherein the first type of angle sensor is sensitive to detect a first magnetic field component in a first direction and the second type of angle sensor is sensitive to detect a second magnetic field component in a second direction,
  wherein a combined rotation angle is determined based on the detected first magnetic field components and the detected second magnetic field components.

Each of the magnetic angle sensor may be a magnetic field angle sensor.

It is in particular noted that each "angle sensor" of the first or second type may be a magnetic angle sensor.

The magnetic field is a vector at each point. This vector can be decomposed into a vector parallel to the rotation axis and a vector orthogonal to the rotation axis. The latter is the diametric magnetic field.

The first group of magnetic angle sensors and the second group of magnetic angle sensors may be spaced apart by at least 0.5 mm along the straight line.

The first direction and the second direction may each be orthogonal to the straight line. The magnetic angle sensors of the first and the second group may be located on a substrate, wherein one of the first direction or the second direction may be (substantially) parallel to the substrate and the other direction may be (substantially) orthogonal to the substrate.

According to an embodiment, the straight line is parallel to or lies on a rotation axis, wherein a shaft is rotatable around the rotation axis and wherein a magnetic field source is connected to the shaft, wherein the magnetic field source provides at least a portion of the first and second magnetic field components.

The magnetic field source is in particular rigidly attached to the shaft.

According to an embodiment, the magnetic field source comprises at least one permanent magnet.

In an embodiment, the first group of magnetic angle sensors and the second group of magnetic angle sensors are located at different z-positions from the magnetic field source, wherein each z-position is defined as a perpendicular dropped from the position of the magnetic angle sensor onto the rotation axis.

According to an embodiment, the straight line is parallel to the rotation axis or lies on the rotation axis or an angle between the straight line and the rotation axis is between 10° and +10°.

According to an embodiment, the first direction is substantially orthogonal to the second direction.

According to an embodiment, the first direction and the second direction span a plane that is substantially orthogonal to the straight line.

According to an embodiment, the first type of angle sensor comprises at least one of the following:
a Hall plate,
a MAG-FET.

According to an embodiment, the second type of angle sensor comprises at least one of the following:
an anisotropic magneto-resistor (AMR),
a giant magneto-resistor (GMR),
a tunneling magneto-resistor (TMR),
a Vertical Hall effect device.

According to an embodiment, the first type of angle sensor and the second type of angle sensor comprises at least one of the following:
an anisotropic magneto-resistor (AMR),
a giant magneto-resistor (GMR),
a tunneling magneto-resistor (TMR),
a Vertical Hall effect device,
a Hall plate,
a MAG-FET.

According to an embodiment, the combined rotation angle is determined based on a first difference between the first type of angle sensors of the first and the second group of angle sensors and based on a second difference between the second type of angle sensors of the first and the second group of angle sensors.

According to an embodiment, the first group of magnetic angle sensors is arranged on a first chip and the second group of magnetic angle sensors is arranged on a second chip.

According to an embodiment, the first group of magnetic angle sensors and the second group of magnetic angle sensors is arranged on a single chip.

According to an embodiment, the device comprises:
a semiconductor substrate with a main surface,
wherein the first type of angle sensor is arranged such that the first direction is perpendicular to the main surface,
wherein the second type of angle sensor is arranged such that the second direction is parallel to the main surface.

According to an embodiment, the at least one first type of angle sensor of the first group of magnetic angle sensors and the at least one first type of angle sensor of the second group of magnetic angle sensors are arranged on the substrate such that gravity centers of the at least one first type of angle sensor of the first group of magnetic angle sensors and of the at least one first type of angle sensor of the second group of magnetic angle sensors lie on a line parallel to the main surface, wherein the gravity centers of the at least one first type of angle sensor of the first group of magnetic angle sensors and of the at least one first type of angle sensor of the second group of magnetic angle sensors do not coincide.

According to an embodiment, the gravity centers of the at least one first type of angle sensor of the first group of magnetic angle sensors and of the at least one first type of angle sensor of the second group of magnetic angle sensors lie on the straight line and are spaced apart by at least 0.5 mm.

According to an embodiment, the at least one second type of angle sensor of the first group of magnetic angle sensors and the at least one second type of angle sensor of the second group of magnetic angle sensors are arranged on the substrate such that the gravity centers of the at least one second type of angle sensor of the first group of magnetic angle sensors and of the at least one second type of angle sensor of the second group of magnetic angle sensors lie on a line, wherein the gravity centers of the at least one second type of angle sensor of the first group of magnetic angle sensors and of the at least one second type of angle sensor of the second group of magnetic angle sensors do not coincide.

According to an embodiment, the gravity centers of the at least one second type of angle sensor of the first group of magnetic angle sensors and of the at least one second type of angle sensor of the second group of magnetic angle sensors lie on the straight line and are spaced apart by at least 0.5 mm.

According to an embodiment, the semiconductor substrate is arranged such that its main surface is parallel to the straight line.

Hence, the magnetic field of the magnetic field source may be detected by at least one of the magnetic field sensors on the semiconductor substrate.

According to an embodiment, the semiconductor substrate is mounted in a leaded package.

In an embodiment, the device further comprises a combining circuit, which determines the combined rotation angle by:
determining a first difference between the first magnetic field component of the at least one first type of angle sensor of the first group of magnetic angle sensors and the at least one first type of angle sensor of the second group of magnetic angle sensors,
determining a second difference between the at least one second type of angle sensor of the first group of magnetic angle sensors and the at least one second type of angle sensor of the second group of magnetic angle sensors,
determining the combined rotational angle based on the first difference and the second difference.

The combined rotational angle is in particular determined by the function arctan 2 (first difference, second difference) or arctan 2 (second difference, first difference).

It is noted that the arctan-function is not without ambiguity across 360°. The arctan-function ranges only from −90° to +90°. In the examples used, a range from −180° to +180° may be preferable. This can be achieved via the function arctan 2(x,y), which is identical with the arctan(y/x) if x≥0. However, if x<0, the following applies:

$$\arctan_2(x, y) = \arctan\frac{y}{x} - \pi,$$

which is indicated in radians (rad).

Also, a magnetic sensor device is provided comprising:
a first group of magnetic angle sensors and a second group of magnetic angle sensors,
wherein the first group of magnetic angle sensors and the second group of magnetic angle sensors are arranged separated from each other,
wherein the first group of magnetic angle sensors comprises at least one first type of angle sensor and at least one second type of angle sensor,
wherein the second group of magnetic angle sensors comprises at least one first type of angle sensor and at least one second type of angle sensor,
wherein the at least one first type of angle sensor of the first group of magnetic angle sensors determines a first signal based on a magnetic field Bx at a first location, wherein the at least one first type of angle sensor of the second group of magnetic angle sensors determines a second signal based on the magnetic field Bx at a second location, wherein the at least one second type of angle sensor of the first group of magnetic angle sensors determines a third signal based on a magnetic field By at a third location, wherein the at least one second type of angle sensor of the second group of magnetic angle sensors determines a fourth signal based on the magnetic field By at a fourth location.

It is noted that the magnetic field Bx is perpendicular to the magnetic field By. The magnetic sensor device may in particular comprise magnetic angle sensors that are arranged in a plane that is (substantially) in parallel to a y-z-plane, wherein the x-, y- and z-components define a Cartesian coordinate system.

It is further noted that the magnetic field Bx may be regarded as any first component of the magnetic field and the magnetic field By may be regarded as a second component of the magnetic field, which is orthogonal to the first component.

In an embodiment, the first signal, the second signal, the third signal and the fourth signal are provided for further processing.

In an embodiment, the device comprises a processing unit for
determining a first difference between the first signal and the second signal,
determining a second difference between the third signal and the fourth signal,
determining a combined rotation angle of a shaft based on the first difference and the second difference.

The shaft is arranged rotatable around a rotation axis. Further, a magnetic field source is connected (e.g., fixed) to the shaft, wherein the magnetic field source provides at least a portion of the magnetic field Bx and at least a portion of the magnetic field By at least at certain rotational positions.

The solution presented is in particular robust against magnetic disturbance fields, because the differences allow reducing or eliminating an effect based on a magnetic stray field.

In an embodiment, the rotation angle is determined based on $$C_0 + C_1 \cdot \arctan(Rt),$$

with
C0 being a real number,
C1 being a real number
Rt being a ratio of the first difference and the second difference.

In an embodiment,
the first location and the second location are spaced apart by at least 0.5 mm in z-direction,
the third location and the fourth location are spaced apart by at least 0.5 mm in z-direction.

In an embodiment, the x-direction, the y-direction and the z-direction define a Cartesian coordinate system.

Further, a method for determining a combined rotation angle by a magnetic angle sensor device is provided,
wherein the magnetic angle sensor device comprises:
a first group of magnetic angle sensors and a second group of magnetic angle sensors,
wherein the first group of magnetic angle sensors and the second group of magnetic angle sensors are located on different positions along a straight line,
wherein the first group of magnetic angle sensors comprises at least one first type of angle sensor and at least one second type of angle sensor,
wherein the second group of magnetic angle sensors comprises at least one first type of angle sensor and at least one second type of angle sensor,
wherein the method comprises:
detecting by the first type of angle sensor a first magnetic field component in a first direction,
detecting by the second type of angle sensor a second magnetic field component in a second direction,
determining the combined rotation angle based on the detected first magnetic field components and the detected second magnetic field components.

Also, a method for determining a combined rotation angle by a magnetic angle sensor device is provided,
wherein the magnetic angle sensor device comprises:
a first group of magnetic angle sensors and a second group of magnetic angle sensors,
wherein the first group of magnetic angle sensors and the second group of magnetic angle sensors are arranged separated from each other,
wherein the first group of magnetic angle sensors comprises at least one first type of angle sensor and at least one second type of angle sensor,
wherein the second group of magnetic angle sensors comprises at least one first type of angle sensor and at least one second type of angle sensor,
wherein the method comprises:
determining by the at least one first type of angle sensor of the first group of magnetic angle sensors a first signal based on a magnetic field Bx at a first location,
determining by the at least one first type of angle sensor of the second group of magnetic angle sensors a second signal based on the magnetic field Bx at a second location,
determining by the at least one second type of angle sensor of the first group of magnetic angle sensors a third signal based on a magnetic field By at a third location,
determining by the at least one second type of angle sensor of the second group of magnetic angle sensors a fourth signal based on the magnetic field By at a fourth location,
determining a first difference between the first signal and the second signal,
determining a second difference between the third signal and the fourth signal,
determining the combined rotation angle of a shaft based on the first difference and the second difference.

Also, a computer program product is suggested that is directly loadable into a memory of a digital processing device, comprising software code portions for performing the steps of the methods as described herein.

Further, a computer-readable medium is suggested having computer-executable instructions that is adapted to cause a computer system to perform the steps of the methods as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a non-transitory computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A magnetic angle sensor device comprising:
    a first group of magnetic angle sensors and a second group of magnetic angle sensors arranged on a plane,
        wherein a first axis of the plane is parallel to a rotation axis of a shaft,
        wherein the first group of magnetic angle sensors and the second group of magnetic angle sensors are located on different positions on the plane,
        wherein the first group of magnetic angle sensors comprises at least one first type of angle sensor and at least one second type of angle sensor,
        wherein the second group of magnetic angle sensors comprises the at least one first type of angle sensor and the at least one second type of angle sensor,
        wherein the first type of angle sensor is sensitive to detect a first magnetic field component in a first direction perpendicular to the plane and the second type of angle sensor is sensitive to detect a second magnetic field component in a second direction parallel to a second axis of the plane,
        wherein the first axis is perpendicular to the second axis, and
        wherein a combined rotation angle is determined based on the detected first magnetic field components and the detected second magnetic field components.

2. The magnetic angle sensor device of claim 1, wherein the shaft is rotatable around the rotation axis,
    wherein a magnetic field source is connected to the shaft, and
    wherein the magnetic field source provides at least a portion of the first and second magnetic field components.

3. The magnetic angle sensor device of claim 2, wherein the magnetic field source comprises at least one permanent magnet.

4. The magnetic angle sensor device of claim 1, wherein the first group of magnetic angle sensors are located at different positions relative to the rotation axis than the second group of magnetic angle sensors.

5. The magnetic angle sensor device of claim 1, wherein the at least one first type of angle sensor comprises at least one of the following:
    a Hall plate, or
    a MAG-FET.

6. The magnetic angle sensor device of claim 1, wherein the at least one second type of angle sensor comprises at least one of the following:
    an anisotropic magneto-resistor (AMR),
    a giant magneto-resistor (GMR), a tunneling magneto-resistor (TMR), or
a Vertical Hall effect device.

7. The magnetic angle sensor device of claim 1, wherein the at least one first type of angle sensor and the at least one second type of angle sensor comprise at least one of:
an anisotropic magneto-resistor (AMR),
a giant magneto-resistor (GMR),
a tunneling magneto-resistor (TMR),
a Vertical Hall effect device,
a Hall plate, or
a MAG-FET.

8. The magnetic angle sensor device of claim 1, wherein the combined rotation angle is determined based on:
a first difference between the at least one first type of angle sensor of the first group of magnetic angle sensors and the at least one first type of angle sensor of the second group of magnetic angle sensors, and
a second difference between the at least one second type of angle sensor of the first group of magnetic angle sensors and the at least one second type of angle sensor of the second group of magnetic angle sensors.

9. The magnetic angle sensor device of claim 1, wherein the first group of magnetic angle sensors is arranged on a first chip and the second group of magnetic angle sensors is arranged on a second chip.

10. The magnetic angle sensor device of claim 1, wherein the first group of magnetic angle sensors and the second group of magnetic angle sensors are arranged on a single chip.

11. The magnetic angle sensor device of claim 1, further comprising:
a semiconductor substrate with a main surface,
wherein the at least one first type of angle sensor is arranged such that the first direction is perpendicular to the main surface,
wherein the at least one second type of angle sensor is arranged such that the second direction is parallel to an axis of the main surface.

12. The magnetic angle sensor device of claim 11, wherein the at least one first type of angle sensor of the first group of magnetic angle sensors and the at least one first type of angle sensor of the second group of magnetic angle sensors are arranged on the semiconductor substrate such that a gravity center of the at least one first type of angle sensor of the first group of magnetic angle sensors and a gravity center of the at least one first type of angle sensor of the second group of magnetic angle sensors lie on a line parallel to the axis of the main surface,
wherein the gravity center of the at least one first type of angle sensor of the first group of magnetic angle sensors and the gravity center of the at least one first type of angle sensor of the second group of magnetic angle sensors do not coincide.

13. The magnetic angle sensor device of claim 12, wherein the gravity center of the at least one first type of angle sensor of the first group of magnetic angle sensors and the gravity center of the at least one first type of angle sensor of the second group of magnetic angle sensors lie are spaced apart by at least 0.5 mm.

14. The magnetic angle sensor device of claim 11, wherein the at least one second type of angle sensor of the first group of magnetic angle sensors and the at least one second type of angle sensor of the second group of magnetic angle sensors are arranged on the semiconductor substrate such that a gravity center of the at least one second type of angle sensor of the first group of magnetic angle sensors and a gravity center of the at least one second type of angle sensor of the second group of magnetic angle sensors lie on a line,
wherein the gravity center of the at least one second type of angle sensor of the first group of magnetic angle sensors and the gravity center of the at least one second type of angle sensor of the second group of magnetic angle sensors do not coincide.

15. The magnetic angle sensor device of claim 14, wherein the gravity center of the at least one second type of angle sensor of the first group of magnetic angle sensors and the gravity center of the at least one second type of angle sensor of the second group of magnetic angle sensors are spaced apart by at least 0.5 mm.

16. The magnetic angle sensor device of claim 11, wherein the semiconductor substrate is arranged such that the main surface is on the plane.

17. The magnetic angle sensor device of claim 11, wherein the semiconductor substrate is mounted in a leaded package.

18. The magnetic angle sensor device of claim 1, further comprising a combining circuit, which determines the combined rotation angle by:
determining a first difference between the first magnetic field component of the at least one first type of angle sensor of the first group of magnetic angle sensors and the at least one first type of angle sensor of the second group of magnetic angle sensors,
determining a second difference between the second magnetic field component of the at least one second type of angle sensor of the first group of magnetic angle sensors and the at least one second type of angle sensor of the second group of magnetic angle sensors, and
determining the combined rotation angle based on the first difference and the second difference.

19. A magnetic sensor device comprising:
a first group of magnetic angle sensors and a second group of magnetic angle sensors arranged on a plane,
wherein a first axis of the plane is parallel to a rotation axis of a shaft,
wherein the first group of magnetic angle sensors and the second group of magnetic angle sensors are arranged separated from each other,
wherein the first group of magnetic angle sensors comprises at least one first type of angle sensor and at least one second type of angle sensor,
wherein the second group of magnetic angle sensors comprises the at least one first type of angle sensor and the at least one second type of angle sensor,
wherein the at least one first type of angle sensor of the first group of magnetic angle sensors determines a first signal based on a magnetic field $B_x$ at a first location in an x-direction perpendicular to the plane,
wherein the at least one first type of angle sensor of the second group of magnetic angle sensors determines a second signal based on the magnetic field $B_x$ at a second location in the x-direction,
wherein the at least one second type of angle sensor of the first group of magnetic angle sensors determines a third signal based on a magnetic field $B_y$ at a third location in a y-direction parallel to a second axis of the plane,
wherein the first axis is perpendicular to the second axis, and
wherein the at least one second type of angle sensor of the second group of magnetic angle sensors determines a fourth signal based on the magnetic field $B_y$ at a fourth location in the y-direction.

20. The magnetic sensor device of claim 19, wherein the first signal, the second signal, the third signal, and the fourth signal are provided to a processing unit.

21. The magnetic sensor device of claim 19, further comprising:
a processing unit configured to:
determine a first difference between the first signal and the second signal,
determine a second difference between the third signal and the fourth signal, and
determine a combined rotation angle of the shaft based on the first difference and the second difference.

22. The magnetic sensor device of claim 21, wherein the combined rotation angle is determined based on $$C_0 + C_1 \cdot \arctan(Rt),$$

with
$C_0$ being a real number,
$C_1$ being a real number,
$R_t$ being a ratio of the first difference and the second difference.

23. The magnetic sensor device of claim 19, wherein the first location and the second location are spaced apart by at least 0.5 mm in a z-direction, and
wherein the third location and the fourth location are spaced apart by at least 0.5 mm in the z-direction.

24. The magnetic sensor device of claim 19, wherein the x-direction, the y-direction, and a z-direction define a Cartesian coordinate system.

25. The magnetic sensor device of claim 19, further comprising:
a third group of magnetic angle sensors,
wherein the first group of magnetic angle sensors are arranged on the rotation axis,
wherein the second group of magnetic angle sensors are arranged on a first side of the rotation axis, and
wherein the third group of magnetic angle sensors are arranged a second side of the rotation axis.

26. A method for determining a combined rotation angle by a magnetic angle sensor device,
wherein the magnetic angle sensor device comprises a first group of magnetic angle sensors and a second group of magnetic angle sensors arranged on a plane,
wherein a first axis of the plane is parallel to a rotation axis of a shaft,
wherein the first group of magnetic angle sensors and the second group of magnetic angle sensors are located on different positions on the plane,
wherein the first group of magnetic angle sensors comprises at least one first type of angle sensor and at least one second type of angle sensor,
wherein the second group of magnetic angle sensors comprises the at least one first type of angle sensor and the at least one second type of angle sensor, and
wherein the method comprises:
detecting, by the magnetic angle sensor device via the at least one first type of angle sensor, a first magnetic field component in a first direction perpendicular to the plane;
detecting, by the magnetic angle sensor device via the at least one second type of angle sensor, a second magnetic field component in a second direction parallel to a second axis of the plane,
the first axis being perpendicular to the second axis; and
determining, by the magnetic angle sensor device, the combined rotation angle based on the detected first magnetic field components and the detected second magnetic field components.

27. The method of claim 26, wherein detecting the first magnetic field component comprises:
detecting the first magnetic field component from a magnetic field source connected to the shaft; and
wherein detecting the second magnetic field component comprises:
detecting the second magnetic field component from the magnetic field source.

28. A method for determining a combined rotation angle by a magnetic angle sensor device,
wherein the magnetic angle sensor device comprises a first group of magnetic angle sensors and a second group of magnetic angle sensors arranged on a plane,
wherein a first axis of the plane is parallel to a rotation axis of a shaft,
wherein the first group of magnetic angle sensors and the second group of magnetic angle sensors are arranged separated from each other,
wherein the first group of magnetic angle sensors comprises at least one first type of angle sensor and at least one second type of angle sensor,
wherein the second group of magnetic angle sensors comprises the at least one first type of angle sensor and the at least one second type of angle sensor,
wherein the method comprises:
determining, by the magnetic angle sensor device via the at least one first type of angle sensor of the first group of magnetic angle sensors, a first signal based on a magnetic field Bx at a first location in an x-direction perpendicular to the plane;
determining, by the magnetic angle sensor device via the at least one first type of angle sensor of the second group of magnetic angle sensors, a second signal based on the magnetic field Bx at a second location in the x-direction;
determining, by the magnetic angle sensor device via the at least one second type of angle sensor of the first group of magnetic angle sensors, a third signal based on a magnetic field By at a third location in a y-direction parallel to a second axis of the plane, the first axis being perpendicular to the second axis;
determining, by the magnetic angle sensor device via the at least one second type of angle sensor of the second group of magnetic angle sensors, a fourth signal based on the magnetic field By at a fourth location in the y-direction;
determining, by the magnetic angle sensor device, a first difference between the first signal and the second signal;
determining, by the magnetic angle sensor device, a second difference between the third signal and the fourth signal; and
determining, by the magnetic angle sensor device, the combined rotation angle of a shaft based on the first difference and the second difference.

29. The method of claim 28, further comprising:
providing the first signal, the second signal, the third signal, and the fourth signal to a processor of the magnetic angle sensor device; and
where determining the combined rotation angle comprises:

computing the combined rotation angle based on providing the first signal, the second signal, the third signal, and the fourth signal to the processor.

30. A non-transitory computer-readable medium storing instructions, the instructions comprising:
one or more instructions that, when executed by one or more processors, cause the one or more processors to:
detect, via at least one first type of angle sensor, a first magnetic field component in a first direction perpendicular to a plane,
a first group of magnetic angle sensors and a second group of magnetic angle sensors being arranged on the plane,
a first axis of the plane being parallel to a rotation axis of a shaft,
the first group of magnetic angle sensors comprising the at least one first type of angle sensor and at least one second type of angle sensor, and
the second group of magnetic angle sensors comprising the at least one first type of angle sensor and the at least one second type of angle sensor;
detect, via the at least one second type of angle sensor, a second magnetic field component in a second direction parallel to a second axis of the plane,
the first axis being perpendicular to the second axis, and
determine a combined rotation angle based on the first magnetic field components and the second magnetic field components.

31. A non-transitory computer-readable medium storing instructions, the instructions comprising:
one or more instructions that, when executed by one or more processors, cause the one or more processors to:
determine, via at least one first type of angle sensor of a first group of magnetic angle sensors, a first signal based on a magnetic field Bx at a first location in an x-direction perpendicular to a plane,
the first group of magnetic angle sensors and a second group of magnetic angle sensors being arranged on the plane,
a first axis of the plane being parallel to a rotation axis of a shaft,
the first group of magnetic angle sensors comprising the at least one first type of angle sensor and at least one second type of angle sensor, and
the second group of magnetic angle sensors comprising the at least one first type of angle sensor and the at least one second type of angle sensor;
determine, via the at least one first type of angle sensor of the second group of magnetic angle sensors, a second signal based on the magnetic field Bx at a second location in the x-direction;
determine, via the at least one second type of angle sensor of the first group of magnetic angle sensors, a third signal based on a magnetic field By at a third location in a v-direction parallel to a second axis of the plane,
the first axis being perpendicular to the second axis;
determine, via the at least one second type of angle sensor of the second group of magnetic angle sensors, a fourth signal based on the magnetic field By at a fourth location in the y-direction;
determine a first difference between the first signal and the second signal;
determine a second difference between the third signal and the fourth signal; and
determine combined rotation angle of the shaft based on the first difference and the second difference.

* * * * *